July 12, 1966   H. GEIST ET AL   3,260,474
COMBINED LOADING AND CONTROL STATION FOR PNEUMATIC TUBES
Filed Sept. 6, 1963   7 Sheets-Sheet 1

INVENTORS
Heinz GEIST
Wolfgang KRANERT
Horst KUTSCHERA

ATTORNEYS

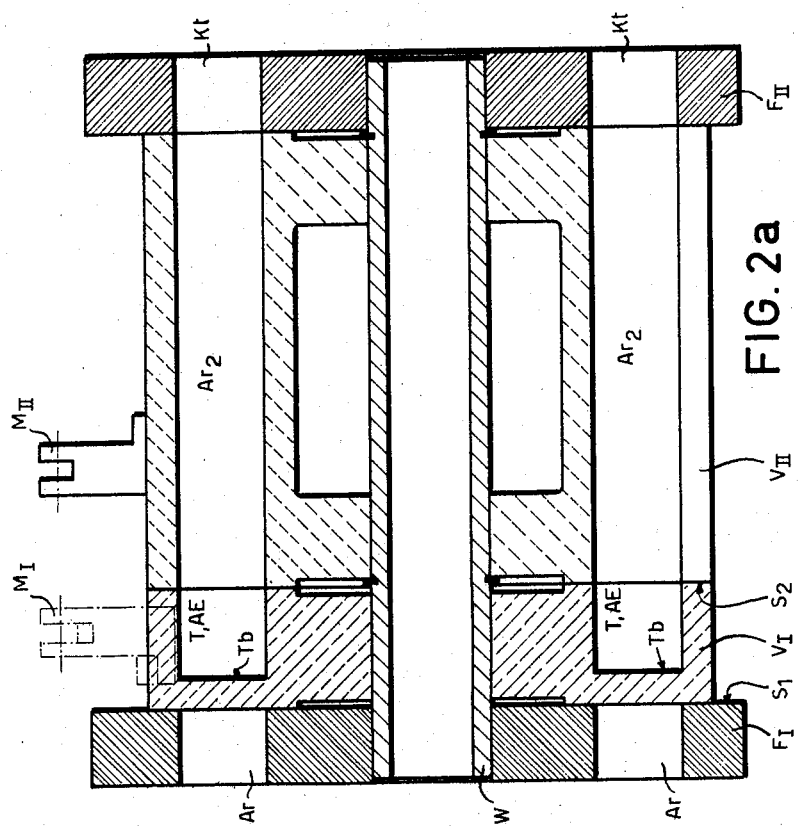

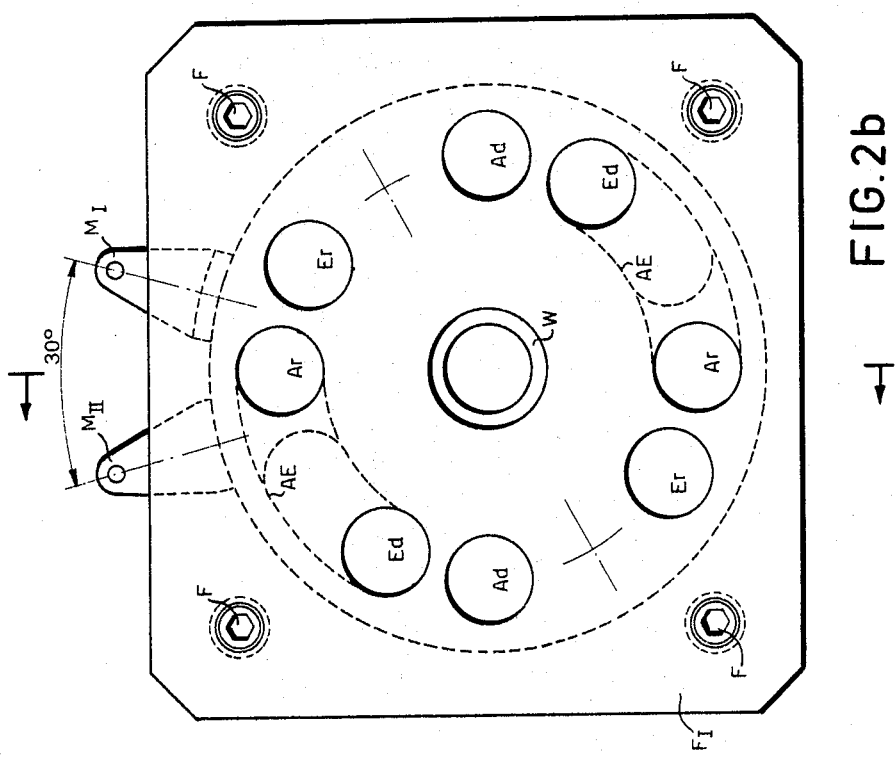

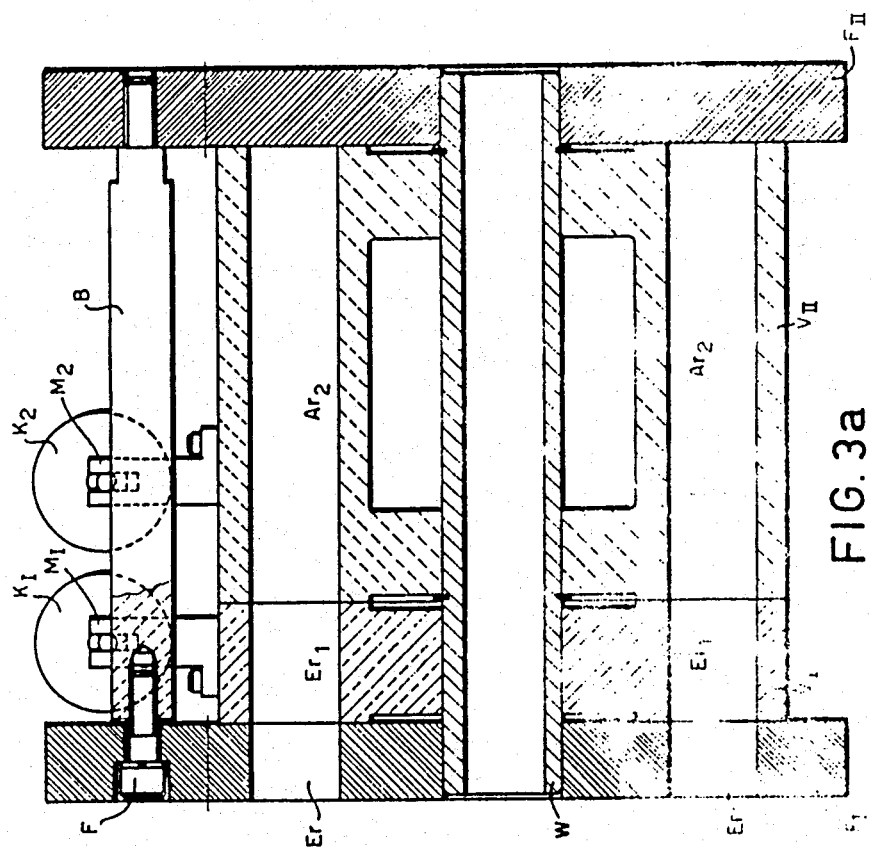

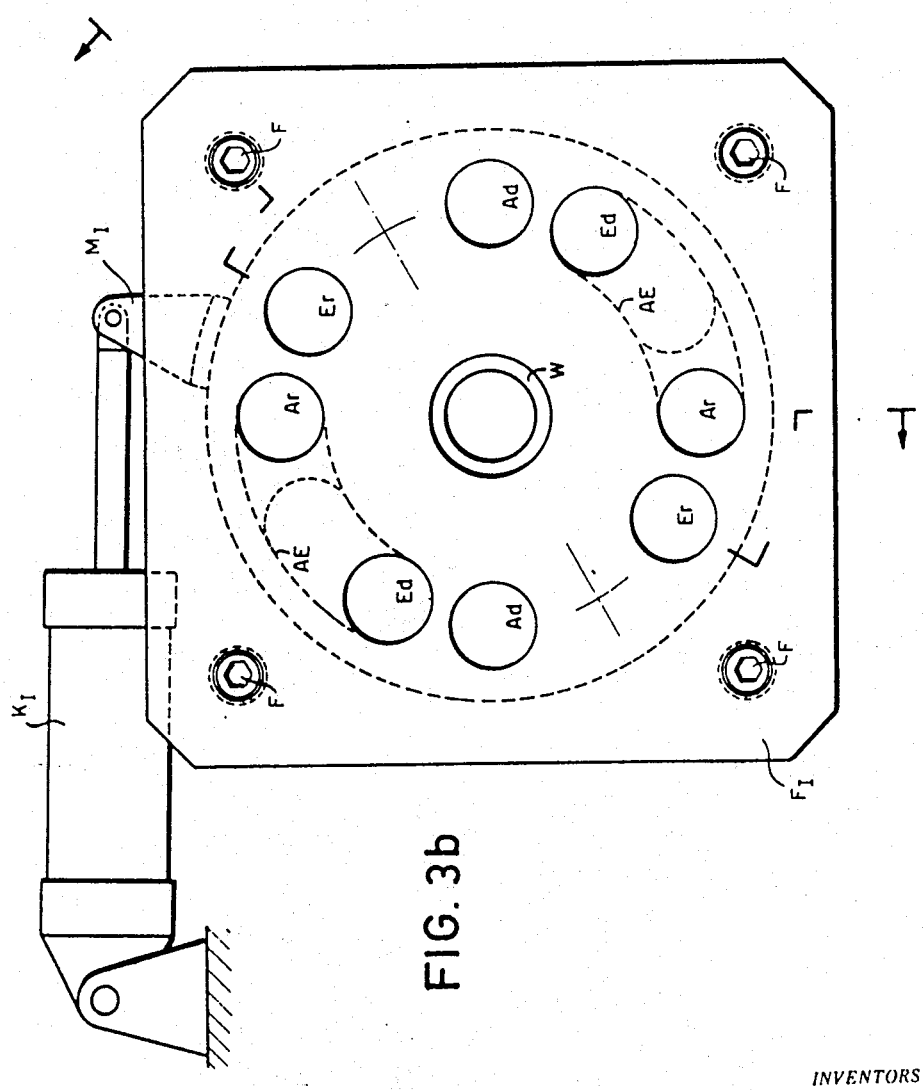

July 12, 1966  H. GEIST ET AL  3,260,474
COMBINED LOADING AND CONTROL STATION FOR PNEUMATIC TUBES
Filed Sept. 6, 1963  7 Sheets-Sheet 6

INVENTORS
Heinz GEIST
Wolfgang KRANERT
Horst KUTSCHERA

ATTORNEYS

July 12, 1966  H. GEIST ET AL  3,260,474
COMBINED LOADING AND CONTROL STATION FOR PNEUMATIC TUBES
Filed Sept. 6, 1963  7 Sheets-Sheet 7

INVENTORS
Heinz GEIST
Wolfgang KRANERT
Horst KUTSCHERA

ATTORNEYS

United States Patent Office 3,260,474
Patented July 12, 1966

3,260,474
COMBINED LOADING AND CONTROL STATION FOR PNEUMATIC TUBES
Heinz Geist, Ispra, and Wolfgang Kranert and Horst Kutschera, Varese, Italy, assignors to European Atomic Energy Community-Euratom, Brussels, Belgium
Filed Sept. 6, 1963, Ser. No. 307,147
Claims priority, application Germany, Sept. 13, 1962,
E 23,518
6 Claims. (Cl. 243—19)

This invention relates to a combined loading and control station for pneumatic tubes, having at least one sluicing-in conduit and one outlet conduit for the containers used as carriers, and at least one inlet conduit and one outlet conduit for the pressure gas on the loading side of the station and at least one transport conduit for the container as well as a pressure gas conduit on the departure side of the station connected to the transport channel at the point of arrival. In the simplest case therefore, the station has four conduit connections at the loading side and two at the departure side. This construction of a pneumatic tube is particularly suitable for rabbit operation in a nuclear reactor.

One of the conduits leading from the departure side of the station to the arrival zone in the reactor serves for the back and forth run of the rabbit and the other for supplying and removing the pressure gas. At the loading side of the station one of the connections serves for sluicing-in and carrying out the rabbit and another for supplying and removing the pressure gas.

It is the object of the present invention to provide for control of the shooting of the rabbit into and out of the arrival zone from a single point of the station, whereby the rabbit may be sluiced into or removed from the conduit system in one and the same station without the use of tube sidings.

With this object in view the above described loading and control station is characterized in accordance with the invention in that the outlet conduit for the container on the loading side and the transport conduit for the container at the departure side of the station on the one hand, and the outlet conduit for the pressure gas at the loading side and the pressure and outlet gas conduit on the departure side of the station on the other hand are oppositely disposed and fixedly aligned with a space therebetween; in that the sluicing-in conduit for the container and the inlet conduit for the pressure gas at the loading side are spacially offset to the same degree with respect to the corresponding coordinated container outlet and pressure gas outlet conduits; and in that in the space between the loading and departure side of the station are serially inserted, and sealed against each other two displaceable conduit joints with conduits aligned and in register with the conduits of the corresponding connecting sides of the station, the joint located at the loading side being provided, instead of and in the same position as a container outlet conduit, with pockets communicable with the container transport conduits of the joint at the departure side but non-communicable with the container transport conduits of the joint at the loading side, the pockets forming a lateral turn of the pressure gas inlet conduit which is widened in the direction towards the sluicing-in conduit into a longitudinal slot of the shape and volume of a longitudinal opening formed by unifying two coordinated conduits.

It is possible in this manner to achieve a substantial decrease in the number of parts required for the construction of the pneumatic tube. Separate loading and unloading stations and pipe sidings are no longer necessary. Furthermore, the operations can be carried out at maximum speed, since the pipe cross-section enlargements of the conduits, usually provided where sidings are present, are no longer required. The problems in connection with sidings are simply solved by suitable coordination of the conduit joints which may be adjusted individually with respect to each other, or together.

The conduit joints are preferably formed as rotatable cylinders and the loading and departure sides of the station as fixed plates. The plates are centrally connected by a shaft on which are mounted the cylinders which are rotatable in the same or in opposite direction and have their faces in sealing engagement. The conduits of the station and their external connections are distributed over arcs of circles which all lie in register about the axis of rotation.

One of the conduit joints, namely the one on the loading side, constitutes the control element. The other serves as loading and shooting-out chamber. The latter has conduits of at least the same length of a pneumatic tube container, while the control cylinder is formed as a disc. The control element controls primarily the pressure medium and secondarily the connection of the transport conduits.

An embodiment of the invention is illustrated schematically in the accompanying drawings in which—

FIGS. 2a and 2b are a section and a front view respectively of the station, as seen from the loading side in rest position;

Figure 4A:
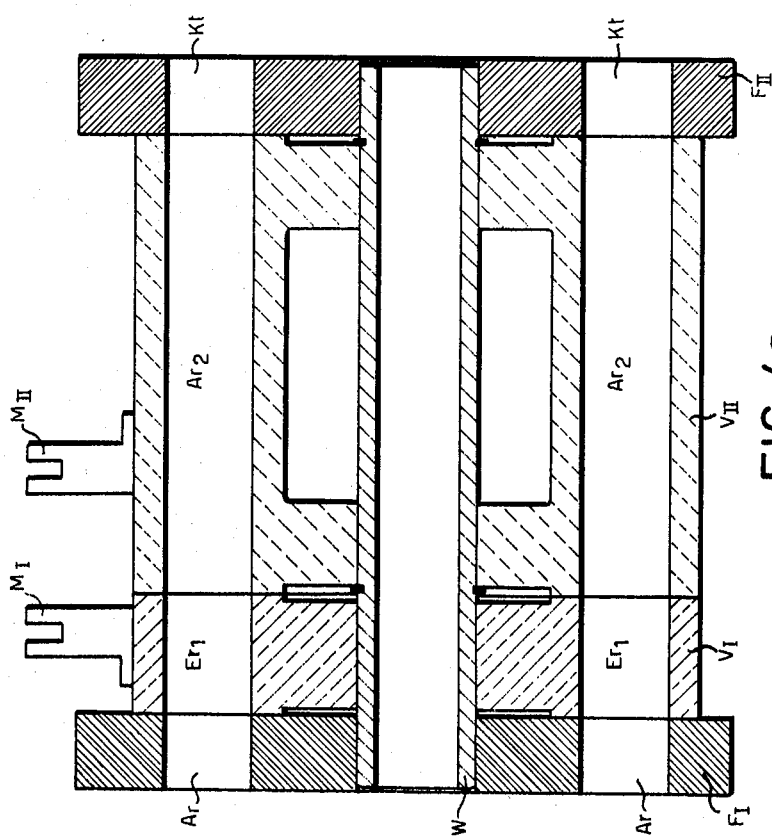
Figure 4B:
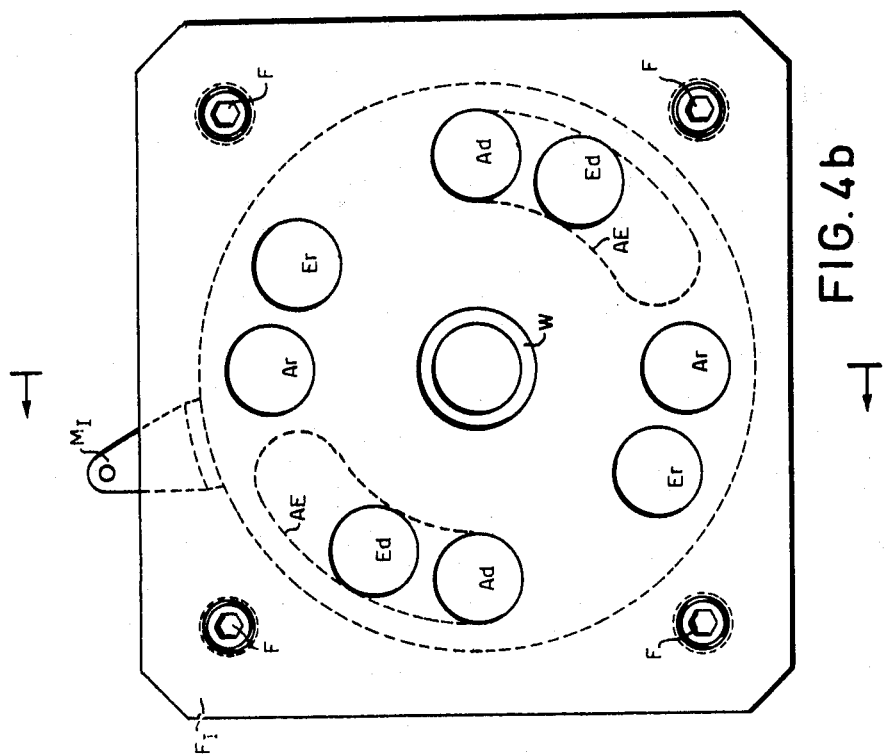

FIGS. 3a and 3b are views corresponding to FIGS. 2a and 2b respectively, showing the sluicing-in position; and FIGS. 4a and 4b are views corresponding to FIGS. 2a and 2b respectively, showing the shooting-out position.

Figure 1:
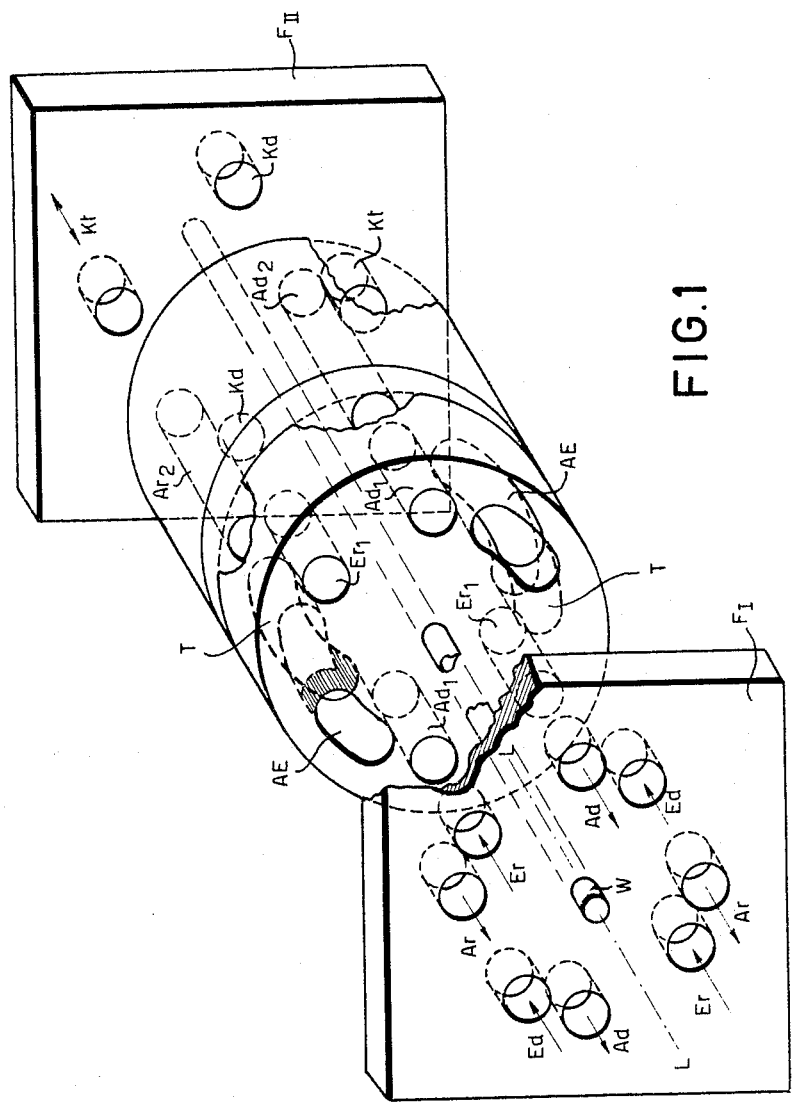
FIG. 1 is a perspective exploded view of the loading and control station.

As shown in FIG. 1 the loading and control station has on the loading side a sluicing-in conduit E$r$ and an outlet conduit A$r$ for the carrier containers, and one inlet and one outlet conduit E$d$, A$d$ for the pressure gas. The station serves two pneumatic tube systems the connections of which lie on either side of the division line L. At the departure side of the station are correspondingly provided two transport conduit K$t$ for the containers and two pressure and outlet gas conduits K$d$. All the conduits lead to the point of arrival in the reactor. At the point of arrival the gas pressure conduits are connected to the transport conduits for the purpose of returning the pressure gas.

In the drawing the front side of the station is the loading side. It is here that the container (rabbit) is sluiced into the tube system. The departure side is disposed at the rear in the drawings.

FIG. 1 clearly illustrates the characteristics of the invention, which are described hereinafter with reference to one of the two conduit systems.

In the first place the outlet conduit A$r$ for the container at the loading side and the transport conduit K$t$ of the container at the departure side of the station on the one hand, and the outlet conduit A$d$ for the pressure gas at the loading side and the pressure or outlet gas conduit K$d$ at the departure side of the station on the other hand, are oppositely disposed and fixedly aligned with a space therebetween.

Secondly, the sluicing-in conduit E$r$ for the container and the inlet conduit E$d$ for the pressure gas at the loading side are spacially offset to the same degree with respect to the corresponding (coordinated) container outlet and pressure gas outlet conduits A$r$ and A$d$.

Thirdly in the space between the loading and departure side of the station are serially inserted and sealed against each other the two displaceable conduit joints V$_I$ and V$_{II}$, whose conduits are aligned and registerable with the conduits of the corresponding connecting sides of the station, that is conduits A*r*, E*r*, A*d* and E*d* on one side and conduits K*t* and K*d* on the other side.

Fourthly in the joint V$_I$ located at the loading side there are provided instead of and in the same position as container outlet conduits, pockets T which can communicate with the container transport conduits A$r_2$ of the joint V$_{II}$ disposed at the departure side, but cannot communicate with the container transport conduits A*r* at the loading side. The pockets in the loading-side joint create a lateral turn of the pressure gas inlet conduits AE. These are widened in the direction towards the sluicing-in conduits E*r* into longitudinal slots of the shape and volume of longitudinal openings formed by unifying two coordinated conduits (A*r*, E*r* or E*d*, A*d*).

As further shown in FIG. 1 the conduit joints V$_I$ and V$_{II}$ are in the form of rotatable cylinders and the loading and departure side of the station are in the form of fixed plates F$_I$ and F$_{II}$. As clearly shown in FIGS. 2*a*, 3*a* and 4*a* the cylinders are mounted between the plates with all their faces in sealing contact and are rotatable in the same or in opposite direction about a central shaft W.

As shown in FIGS. 2*b*, 3*b* and 4*b* all the conduit connections and conduits of the station lie on registering arcs of circles about the axis of rotation of the cylinders. The conduits A$r_2$ and A$d_2$ of the cylinder V$_{II}$ which forms the loading chamber are at least as long as a rabbit. The control element V$_I$ may be made substantially shorter, in the form of a disc.

The above mentioned figures show in detail that the transport and pressure gas conduits K*t* and K*d* on the departure side and the aligned outlet conduits AE, A$r_2$, A$d_2$ of the joints and of the loading side are offset by 90° with respect to each other. They show furthermore that the inlets E*r* and E*d* of the plate and of the control element which are coordinated with the loading side outlets A*r* and A*d* (conduit E$r_1$ is here involved) are likewise offset by 30° in clockwise direction with respect to the outlets A*r* and A*d*. The longitudinal conduits AE of the control element extend, at the contact surface S$_1$ (FIG. 2*a*) with the plate on the loading side, over an arc of 30°. At the contact surface S$_2$ with the loading chamber they extend over an arc of 60°. As already mentioned in connection with the division line, L, the station is formed in regard to the conduits which are present as a twin station, with the conduits of like function being oppositely disposed with respect to the axis of rotation W. For an understanding of the operation of the loading and control station according to the invention it is therefore sufficient to limit the description to one of the conduit systems.

From the viewpoint of the construction of the device, FIGS. 2*a* to 4*b* show in general that the plates F$_I$ and F$_{II}$ are connected at the corners by threaded bolts B, which also function as spacers, and by screws F. The rotation shaft of the conduit joints is tubular and penetrates into the plates. The conduit joints V$_I$ and V$_{II}$ themselves are freely mounted on the shaft. They are connected to drives K$_I$ and K$_{II}$ respectively through the intermediary of links M$_I$ and M$_{II}$.

The operation of the novel loading and control station, which is the same for both conduit systems, is as follows:

In the rest position of the station (FIGS. 2*a* and 2*b*) which also corresponds to FIG. 1, only the pressure and outlet gas conduits are in free communication in the direction towards the outlet A*d*. The transport conduits are shut off by the floors T*b* (FIG. 2*a*) of the pockets T of the conduit joint V$_I$.

When a rabbit is to be shot to the point of arrival, it must first be introduced from the outside into the transport conduit of the station. To this end the loading chamber V$_{II}$ is rotated in clockwise direction through 30° (FIGS. 3*a* and 3*b*). Thereupon the conduits E*r*, E$r_1$ and A$r_2$ of the plate, control disc and loading chamber respectively, are in alignment and the rabbit may be pushed into the loading chamber V$_{II}$. By turning the loading chamber back to its original position the rabbit comes to lie in front of the pocket T and at the same time in line with the transport conduit K*t*. The longitudinal opening AE of the control cylinder communicates with the pressure gas inlet conduit E*d* of the plate F$_I$.

By opening of a valve (not shown) in the gas supply pipe to conduit E*d* gas enters behind the rabbit and drives it to its goal. The spent gas exits through the conduit connection K*d*, A$d_2$, A$d_1$ and A*d*. Conduit A*d* is connected to the spent gas system of the pneumatic tube. The rabbit is received at the point of arrival and remains there until it is shot back.

Like the shooting-in, also the shooting-out operation is set off from the loading and control station. The control cylinder V$_I$ is turned in counterclockwise direction through 30° (FIGS. 4*a* and 4*b*). In this position the conduits K*t*, A$r_2$ and E$r_1$ are aligned and in register. The rabbit thus has available a transport conduit leading to the outside of the station. The pocket T of the control cylinder is inoperative but its longitudinal opening places into communication the pressure gas inlet and outlet conduits E*d* and A*d* of the plate F$_I$. If the valve in the gas supply pipe to the conduit E*d* is again operated, pressure gas passes from conduit E*d* through AE into conduit A$d_2$ and from there through K*d* and the connecting pipe it reaches behind the rabbit. Of course the outlet pipe leading from conduit A*d* to the exterior is closed. The rabbit is set in motion and leaves the station through A*r* pushing the spent gas ahead of it.

I claim:

1. In a combined loading and control station for pneumatic tubes comprising a loading side and a departure side, at least one sluicing-in and one outlet conduit for a container and an inlet conduit and an outlet conduit for pressure gas on said loading side of the station, and at the departure side of the station at least one transport conduit for said container and a pressure gas conduit connected at a point of arrival to said transport conduit; the improvements consisting in that the outlet conduit for the container on the loading side of the transport conduit for the container at the departure side of the station on the one hand, and the outlet conduit for the pressure gas at the loading side and the pressure and outlet gas on the departure side of the station on the other hand are oppositely disposed and fixedly aligned with a space therebetween; in that the sluicing-in conduit for the container and the inlet conduit for the pressure gas at the loading side are spacially offset to the same degree with respect to the coordinated container outlet and pressure gas outlet conduits; and in that in the space between the loading and departure side of the station are serially inserted, and sealed against each other two displaceable conduit joints with conduits aligned and in register with the conduits of the corresponding connecting sides of the station, the joint located at the loading side being provided, instead of and in the same position as a container outlet conduit, with pockets communicable with the container transport conduits of the joint at the departure side but non-communicable with the container transport conduits of the joint at the loading side, the pockets forming a lateral turn of the pressure gas inlet conduit which is widened in the direction towards the sluicing-in conduit into a longitudinal slot of the shape and volume of a longitudinal opening formed by unifying two coordinated conduits.

2. A combined loading and control station according to claim 1, wherein said loading and departure sides of the station comprise fixed plates and said conduit joints consist of rotatable cylinders with all their faces in sealing engagement, mounted on a shaft connecting said plates.

3. A combined loading and control station according to claim 2, wherein all the conduit connections are located on registering arcs of circle about the axis of said rotation shaft.

4. A combined loading and control station according to claim 1, wherein the conduits within said joint on the loading side are of the length of a pneumatic tube container, while side joint on the departure side is formed as a control disc.

5. A combined loading and control station according to claim 3, wherein the transport and pressure gas conduits of the departure side and the outlet conduits of the joint and of the loading side which are aligned therewith are offset with respect to each other by 90°, and the inlets of the loading side and of the corresponding conduit joint which are coordinated to the loading side outlets are offset with respect to said outlets by 30°, and said conduit provided with pockets forming said lateral turning and said longitudinal opening, extends at its contact surface with the plate on the loading side over an arc of 30° and at the contact surface with the conduit joint at the departure side over an arc of 60°.

6. A combined loading and control station according to claim 5, wherein the station is formed as a twin station, with conduits of like function oppositely disposed with respect to the axis of rotation of the joints.

No references cited.

EVON C. BLUNK, *Primary Examiner.*

ANDRES H. NIELSEN, *Examiner.*